United States Patent
Giles et al.

(10) Patent No.: US 9,250,331 B2
(45) Date of Patent: Feb. 2, 2016

(54) METHOD AND APPARATUS FOR PROVIDING MAPPING DATA

(75) Inventors: Christopher Giles, Auburn, AL (US); Harold Stewart, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1084 days.

(21) Appl. No.: 12/347,371

(22) Filed: Dec. 31, 2008

(65) Prior Publication Data

US 2010/0164791 A1 Jul. 1, 2010

(51) Int. Cl.
*G01C 21/30* (2006.01)
*G01S 19/39* (2010.01)

(52) U.S. Cl.
CPC ................... *G01S 19/39* (2013.01)

(58) Field of Classification Search
USPC .......... 701/33, 409, 445, 446, 450, 468, 517, 701/532, 2–3, 200–209; 700/56
See application file for complete search history.

(56) References Cited

U.S. PATENT DOCUMENTS

| | | | | |
|---|---|---|---|---|
| 6,343,301 B1 * | 1/2002 | Halt | G06F 17/30241 | 701/450 |
| 6,845,322 B1 * | 1/2005 | Chao | G01C 21/3415 | 342/357.51 |
| 7,406,482 B2 * | 7/2008 | Dorum | G06F 17/30241 | 701/450 |
| 7,606,663 B2 * | 10/2009 | Neef | G01C 21/362 | 455/456.1 |
| 8,019,531 B2 * | 9/2011 | Pinkus | G01C 21/362 | 340/995.19 |
| 8,543,335 B2 * | 9/2013 | Gruijters | G01C 21/32 | 340/993 |
| 2003/0229444 A1 * | 12/2003 | Bullock et al. | | 701/202 |
| 2004/0054428 A1 * | 3/2004 | Sheha et al. | | 700/56 |
| 2004/0172418 A1 * | 9/2004 | Dorum | G06F 17/30241 | |
| 2007/0005233 A1 * | 1/2007 | Pinkus | G01C 21/362 | 701/416 |
| 2007/0150173 A1 * | 6/2007 | Neef et al. | | 701/200 |
| 2007/0264974 A1 * | 11/2007 | Frank | H04L 63/0407 | 455/411 |
| 2008/0065325 A1 * | 3/2008 | Geelen | G01C 21/32 | 701/414 |
| 2008/0103689 A1 * | 5/2008 | Graham | G01C 21/26 | 701/431 |
| 2008/0120171 A1 * | 5/2008 | Ikeuchi | G01C 21/32 | 705/13 |
| 2010/0014712 A1 * | 1/2010 | Sampedro Diaz | G08G 1/0104 | 382/104 |

* cited by examiner

*Primary Examiner* — Luke Gilligan
*Assistant Examiner* — Edward Winston, III

(57) ABSTRACT

A method and apparatus for providing mapping data in a network are disclosed. For example, the method receives coordinate data from a customer mobile endpoint device, and processes the coordinate data against at least one existing map. The method then identifies a route associated with the coordinate data as a candidate new route if the route is not previously known on the at least one existing map.

10 Claims, 4 Drawing Sheets

METHOD AND APPARATUS FOR PROVIDING MAPPING DATA

The present invention relates generally to communication networks and, more particularly, to a method for providing mapping data to a network, e.g., a packet network, an Internet Protocol (IP) network, a wireless network, and the like.

BACKGROUND OF THE INVENTION

Today's communications networks are used to access services from any location. For example, Internet service providers enable their customers to access a variety of services such as news, weather reports, map search, product search, and so on. For example, a customer may search for travel directions. However, the data being used by the service provider for mapping a geographical area may be outdated. For example, when a new street is added in a neighborhood, there may be a time lag between the opening of the street for travel and the street showing up on a map. New neighborhoods are often unaccounted for on street maps due to this time lag.

SUMMARY OF THE INVENTION

In one embodiment, the present invention discloses a method and apparatus for providing mapping data in a network. For example, the method receives coordinate data from a customer mobile endpoint device, and processes the coordinate data against at least one existing map. The method then identifies a route associated with the coordinate data as a candidate new route if the route is not previously known on the at least one existing map.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing mapping data to a network, e.g., a packet network or a cellular network. Although the present invention is discussed below in the context of wireless and Internet Protocol (IP) networks, the present invention is not so limited. Namely, the present invention can be applied for other networks such as the traditional switched networks.

Figure 1:
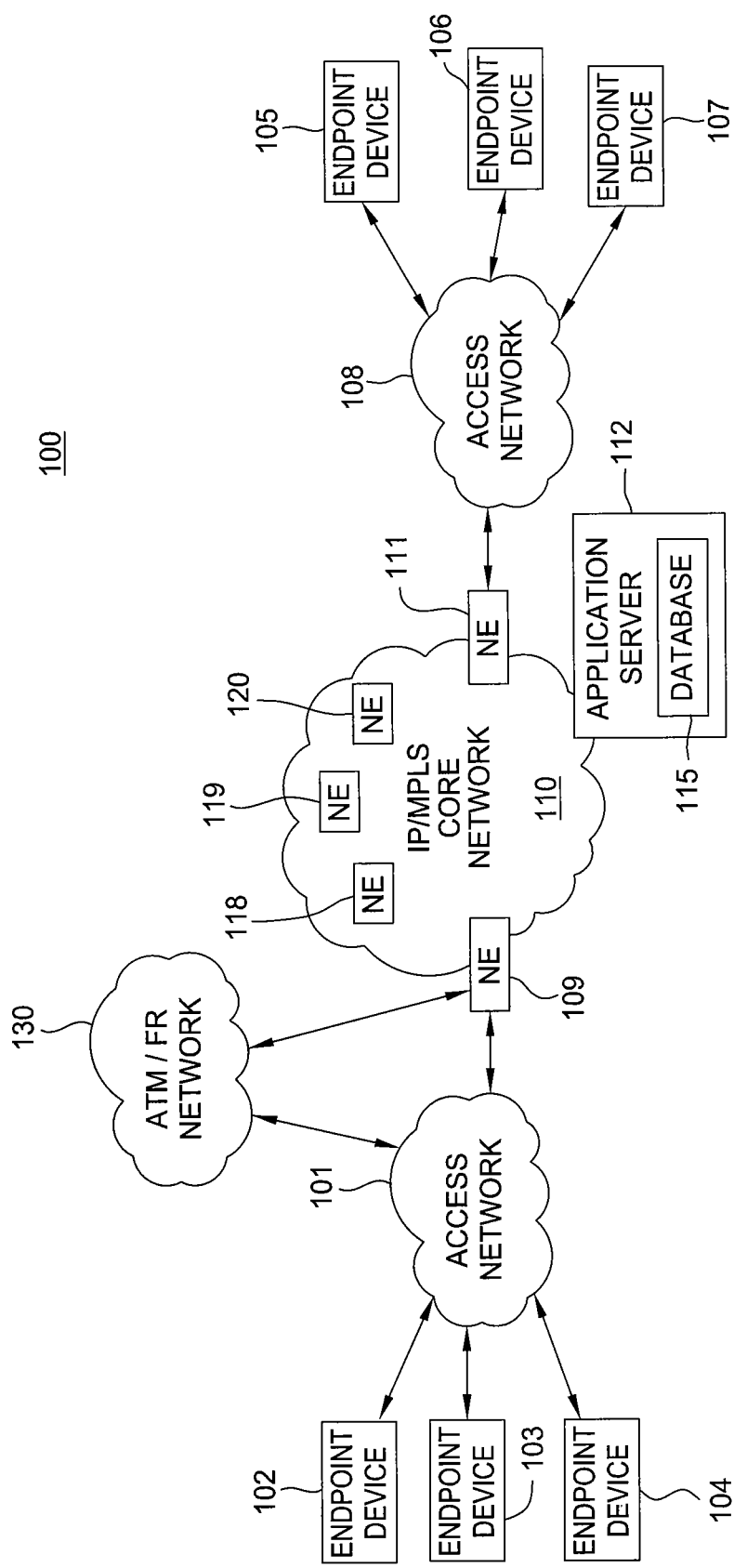
FIG. 1 is a block diagram depicting an exemplary packet network related to the current invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication network 100 may be expanded by including additional endpoint devices, access networks, network elements, application servers without altering the scope of the present invention.

The above IP network is described to provide an illustrative environment in which packets for voice, data and multimedia services are transmitted on networks. More specifically, the above network is described to illustrate that mapping data, e.g., from an endpoint device, can be sent to an application server 112, where the mapping data can be used to update maps that in turn can be accessed by other endpoint devices.

In one embodiment, the current invention discloses a method and apparatus for providing mapping data over communications networks such as a wireless network, Internet Protocol (IP) networks, etc. In order to clearly illustrate the teachings of the current invention, the following terminologies and networking concepts will first be described:

A global navigation satellite system;
Global Positioning System (GPS);
A GPS receiver; and
A Geographical Information System (GIS).

A global navigation satellite system refers to an electronic receiver placed in user devices to enable the devices to determine their own longitudinal, latitudinal and/or altitudinal location to within a few meters by measuring the time signals transmitted by satellites along a line of sight take to reach their destination.

Global Positioning System (GPS) refers to a specific global navigation satellite system created by the U.S. Department of Defense. It was designed so that signals from at least four satellites would be on the horizon at all times. The four signals are sufficient to compute the current latitude, longitude and elevation of a GPS receiver to within a few meters.

A GPS receiver refers to a device that can calculate its own location by receiving signals transmitted by satellites and using triangulation. The GPS receiver calculates the distance to the satellites via the received signals by comparing the times the transmitted signals were sent with the times they were received. By knowing the precise locations of the satellites at a given moment, the receiver uses triangulation to pinpoint its own location.

A Geographical Information System (GIS) refers to an information system used for capturing, storing, analyzing, managing and/or displaying data that is spatially referenced to the Earth.

A service provider may enable its customer to access street level GIS data. For example, a customer may access street level data for travel purposes, e.g., by mapping a route to travel to a particular destination. Another customer may access street level data to learn about the layout of a neighborhood, e.g., locating a business, predicting traffic patterns, zone planning, planning routes for school buses, and so on.

GIS data can be populated by digitizing aerial photographs, etc. Thus, the process of updating GIS data is time consuming and costly. The amount of time it takes a new route (street) to show up on a GIS database is often counted in months or years. In one embodiment, the current invention provides a method for providing mapping data by gathering coordinate data from customer endpoint devices with GPS receivers.

Figure 2:
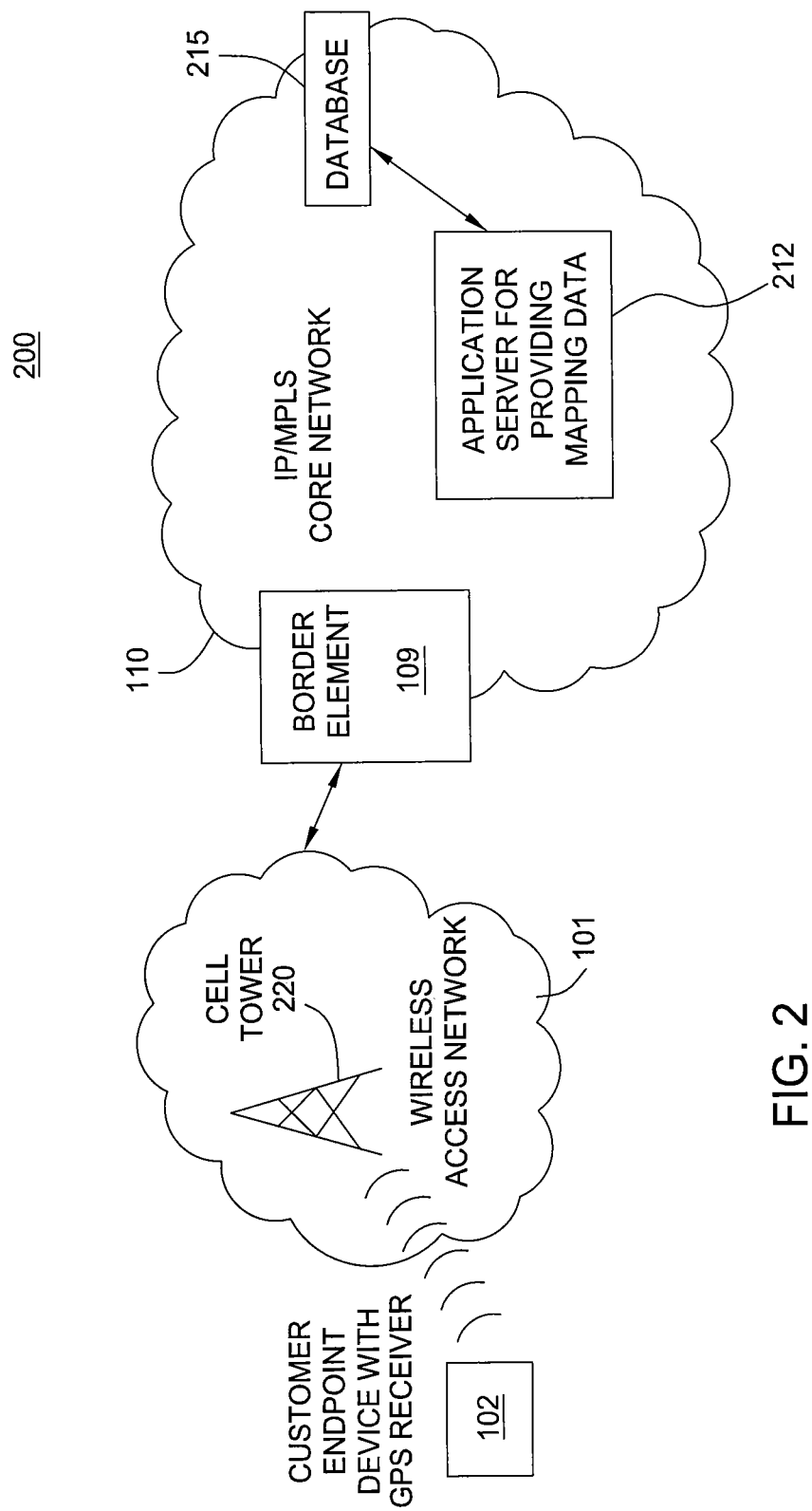
FIG. 2 illustrates an exemplary network for providing mapping data.

FIG. 2 illustrates an exemplary network 200 for providing mapping data. For example, customer endpoint device with a GPS receiver 102 may access services from the IP/MPLS network 110 via a radio frequency tower (e.g., cell tower) 220. The cell tower is deployed by a wireless access network 101. The access network 101 is connected to an IP/MPLS core network 110 through a gateway router or a border element 109. The IP/MPLS core network 110 also contains an application server 212 and a database 215.

In one embodiment, the service provider implements the current method for providing mapping data in application server 212. For example, the application server 212 stores coordinate data received from a plurality of customer endpoint devices, and mapping data (e.g., street level data) in the database 215. The access network 101 may be a cellular network, a Wireless Local Area Network (WLAN), a Wireless Wide Area Network (WWAN), a Worldwide Interoperability for Microwave Access (WiMax), etc.

In one embodiment, the customer endpoint device records its own coordinate data and transmits the coordinate data to an application server located in the service provider's network. For example, the customer endpoint device 102 may periodically send its coordinate data to the application server 212. The application server then gathers the coordinate data and compares the data to an existing map to identify possible updates.

For example, the application server may maintain a map based on the latest updates. When the coordinate data is received from an endpoint device, the data is placed or traced over the existing map, to determine whether the received coordinate data is for a previously known route or street on the existing map. If the application server 212 detects a route or street that is not previously known, then the route is identified as a candidate or potential new route. The candidate new route may then be provided to another system or a human screener for validation. For example, the candidate new route may be verified by comparing to other sources, e.g., postal addresses, city planning records, etc. If the route is verified as being a new route, the route is then added to the database 215. In other words, the existing map maintained by application server 212 will then include the newly added route or street.

In one embodiment, the customer endpoint device records its coordinate data and uploads the coordinate data in a predetermined schedule. For example, the customer endpoint device may record the coordinate data continuously, aggregate the coordinate data over a predetermined time period (e.g., every 15 minutes, every 30 minutes, hourly, daily and so on), and upload the data only at the end of the aggregation period to the application sever. In another embodiment, the customer endpoint device may transmit its coordinate data without aggregation, e.g., uploading the coordinate data to the application server as it is collected.

In one embodiment, the service provider enables a customer to opt-in for having the customer's coordinate data transmitted to the service provider. For example, a customer may wish to have a new street that he/she is using to be uploaded such that existing maps will be quickly updated with the new street. For example, if a customer has moved recently into a newly developed neighborhood, it will take a considerable amount of time before the newly developed neighborhood and its streets to be properly reflected in the latest maps. This posts a significant problem to the customer, since many services may require accurate map information.

For example, the customer may call a restaurant to have food be delivered to the customer's home, but since the customer's neighborhood is relatively new, the restaurant delivery person may have trouble locating the customer's home. Even if the restaurant delivery person is using a navigation system, the navigation system may have outdated maps that do not reflect the new neighborhood of the customer.

In another example, the customer may be interested in having friends over for a gathering. For example, friends of the customer may use various mapping programs (e.g., MapQuest of Denver, Col.) that are available on the Internet to plot a route to the customer's home. However, if the customer's newly developed neighborhood has not be properly documented in existing maps and/or databases used by the on-line mapping programs, then a query for direction to the customer's home may not be recognized. Thus, a customer may have vested interest in having the newly developed neighborhood be recognized by various organizations as soon as possible.

In one embodiment, the service provider enables a customer to opt-out of having the customer's coordinate data transmitted to the service provider. For example, a customer may have a privacy concern or may be using a route that he/she does not wish to be included or recognized on a map. For example, a customer may use a shortcut through a non-public road (e.g., private property) and may wish to avoid having the GPS receiver to transmit the shortcut coordinate data to the application server. For example, the shortcut route may be usable only among neighbors.

In one embodiment, the service provider enables the customer to selectively start and/or to end the recording and transmission of coordinate data. For example, a customer may wish to have a route be recorded and transmitted to the service provider on only one occasion, where subsequent traversal over the same route will not trigger the recording and transmission of the coordinate data. One reason is that the customer may not want to burden the service provider with the same information repeatedly or to unnecessarily consume access bandwidth or air time minutes in transmitting the same coordinate data to the service provider.

In one embodiment, the customer may provide coordinate data in conjunction with the street name. For example, a customer may be driving in a new neighborhood and may wish to have the benefit of having the streets in the new neighborhood show up on a map. The customer may then drive into the new neighborhood with the GPS enabled customer endpoint device, thereby recording the coordinate data of the one or more new routes or streets as the customer traverses through the neighborhood. The customer may then enter a street name for the recorded coordinate data. For example, the street, from a specific coordinate data A to a specific coordinate data B, is a street named "xyz" and so on.

In one embodiment, the service provider aggregates coordinate data from a plurality of customers to identify a candidate route update. For example, the service provider may set a threshold for a number of customers reporting coordinate data for a possible new street. For example, if only one customer endpoint device has reported coordinate data for a new route, then it is likely that the customer is using a shortcut that is generally not available to other users. In contrast, if 100 customers report coordinate data that all reflect a candidate or potentially new street that is not currently reflected in existing maps, then the street is probably a new street and should be added to the existing maps.

Figure 3:
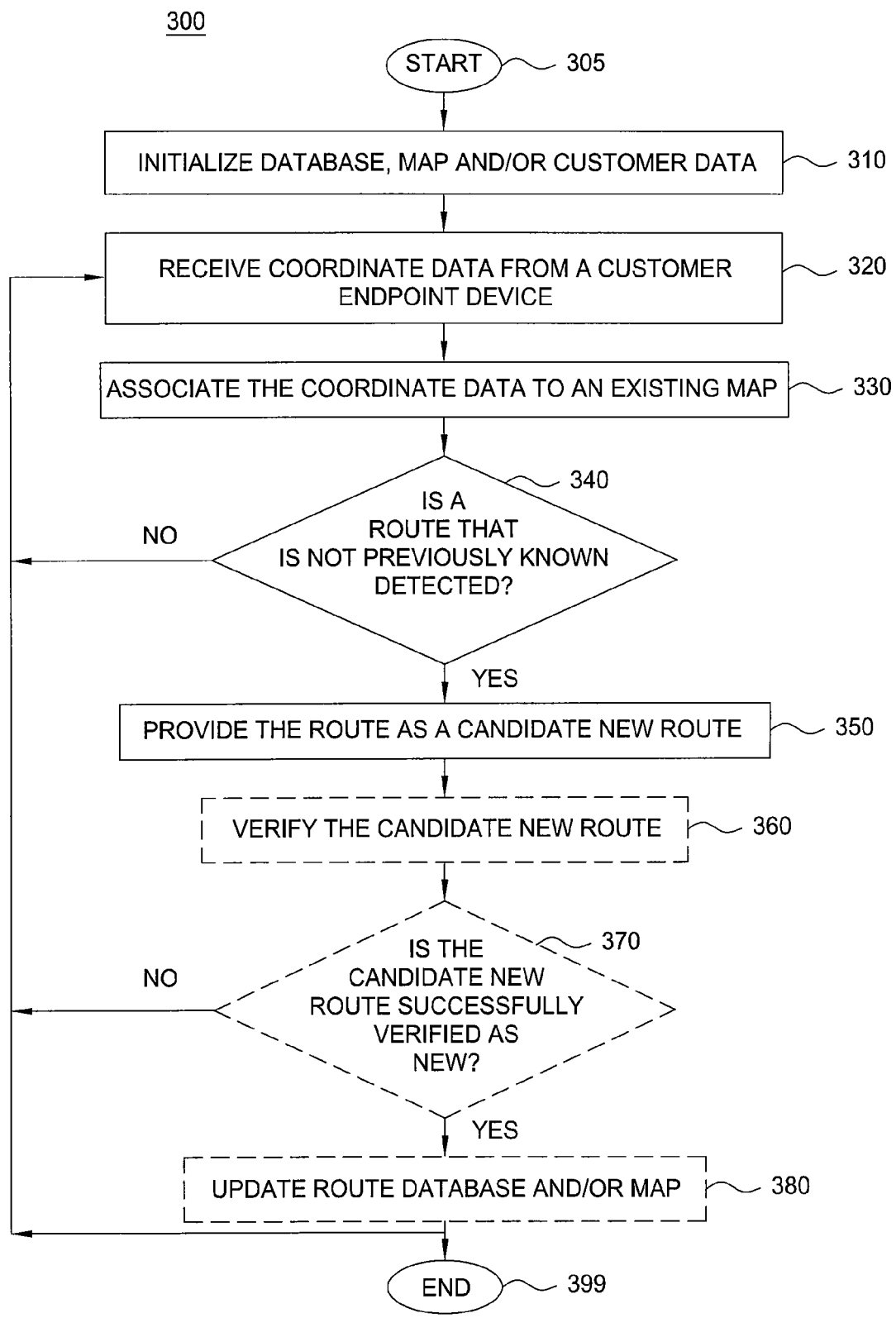
FIG. 3 illustrates a flowchart of a method for providing mapping data.

FIG. 3 illustrates a flowchart of a method 300 for providing mapping data in a network. For example, one or more steps of method 300 can be implemented in an application server. Method 300 starts in step 305 and proceeds to step 310.

In step 310, method 300 initializes one or more route databases, map and/or customer data. For example, the method loads existing known routes to the database and maps the routes. The service provider also maintains a database containing a list of customer endpoint devices that may send their coordinate data. For example, the customer may have opted in to have the coordinate data gathered from his/her GPS enabled device.

In step 320, method 300 receives coordinate data from a customer mobile endpoint device wherein the coordinate data comprises one or more of a longitudinal, latitudinal and/or altitudinal location of the customer endpoint device, e.g., over a period of time. For example, an application server receives the coordinate data from a GPS enabled customer endpoint device.

In step 330, method 300 associates or traces the coordinate data to an existing map. For example, the application server may maintain a map based on the latest updates. When coordinate data is received, the coordinate data is interpreted and placed over the existing map, to determine whether the received coordinate data is for a previously known route.

In step 340, method 300 determines if a route that is not previously known is detected. If the method detects a new route that is not previously known, the method proceeds to step 350. Otherwise, the method proceeds back to step 320 to continue receiving coordinate data.

In step 350, method 300 provides or identifies the route as a candidate new route. For example, the method provides the route as a candidate new route to another system or a human screener for validation.

In optional step 360, method 300 verifies the candidate new route. For example, the method may verify the candidate new route by comparing to other sources, e.g., postal addresses, city planning records, etc. Alternatively, the candidate new route can be verified against a predefined threshold, e.g., determining whether the candidate new route has been reported by "x" number of different customers.

In optional step 370, method 300 determines if the candidate new route is successfully verified as a new route. If the route is verified as being new, the method proceeds to step 380. Otherwise, the method proceeds back to step 320 to continue receiving coordinate data.

In optional step 380, method 300 updates one or more route databases and/or maps. The method then ends in step 399 or returns to step 320 to continue receiving coordinate data.

Those skilled in the art realize that although the current invention is described above for GPS systems, the method can be applied to other global navigation satellite systems such as, the European's Galileo positioning system, Russia's GLONASS, and so on without any loss of generality.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
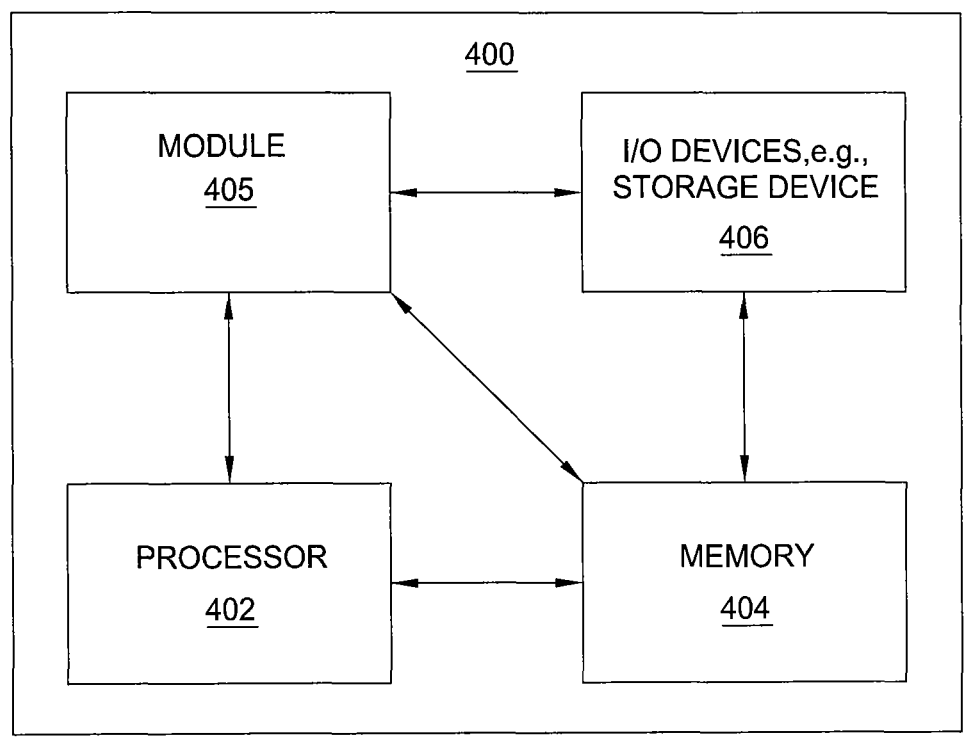
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing mapping data, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing mapping data can be loaded into memory 404 and executed by processor 402 to implement the functions as discussed above. As such, the present method 405 for providing mapping data (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a plurality of coordinate data in a network, the method comprising:

receiving, by a processor of an application server in the network, an opt-in from a customer mobile endpoint device to have the plurality of coordinate data transmitted from the customer mobile endpoint device to the application server in the network;

receiving, by the processor of the application server in the network, the plurality of coordinate data transmitted from the customer mobile endpoint device as the customer mobile endpoint device traverses a route to a location that is not documented on an existing map, wherein the plurality of coordinate data is received with a street name;

processing, by the processor, the plurality of coordinate data, wherein the processing comprises comparing the plurality of coordinate data against the existing map;

identifying, by the processor, the route associated with the plurality of coordinate data as a candidate new route to add to the existing map when the route is not previously known on the existing map;

verifying, by the processor, the candidate new route as a new route when a number of customers reporting the plurality of coordinate data for the candidate new route is above a predefined threshold, wherein the verifying the candidate new route comprises verifying the candidate new route against postal addresses; and updating, by the processor, a route database with the candidate new route and the street name when the candidate new route is verified as the new route, wherein the route database is stored in the network.

2. The method of claim 1, wherein the plurality of coordinate data comprises geographic coordinates of the customer mobile endpoint device.

3. The method of claim 1, wherein the customer mobile endpoint device comprises a receiver for a global navigation satellite system.

4. The method of claim 3, wherein the global navigation satellite system comprises a global positioning system.

5. The method of claim 1, wherein the plurality of coordinate data is received in accordance with a predetermined schedule.

6. A non-transitory computer-readable medium storing a plurality of instructions which, when executed by a processor of an application server, cause the processor to perform operations for processing a plurality of coordinate data in a network, the operations comprising:

receiving at the application server in the network an opt-in from a customer mobile endpoint device to have the plurality of coordinate data transmitted from the customer mobile endpoint device to the application server in the network;

receiving at the application server in the network the plurality of coordinate data transmitted from the customer mobile endpoint device as the customer mobile endpoint device traverses a route to a location that is not documented on an existing map, wherein the plurality of coordinate data is received with a street name;

processing the plurality of coordinate data, wherein the processing comprises comparing the plurality of coordinate data against the existing map;

identifying the route associated with the plurality of coordinate data as a candidate new route to add to the existing map when the route is not previously known on the existing map;

verifying the candidate new route as a new route when a number of customers reporting the plurality of coordinate data for the candidate new route is above a predefined threshold, wherein the verifying the candidate new route comprises verifying the candidate new route against postal addresses; and updating a route database with the candidate new route and the street name when the candidate new route is verified as the new route, wherein the route database is stored in the network.

7. The non-transitory computer-readable medium of claim 6, wherein the plurality of coordinate data comprises geographic coordinates of the customer mobile endpoint device.

8. The non-transitory computer-readable medium of claim 6, wherein the customer mobile endpoint device comprises a receiver for a global navigation satellite system.

9. The non-transitory computer-readable medium of claim 6, wherein the plurality of coordinate data is received in accordance with a predetermined schedule.

10. An apparatus for processing a plurality of coordinate data in a network, the apparatus comprising:

a processor of an application server deployed in the network; and a computer-readable medium storing a plurality of instructions which, when executed by the processor, cause the processor to perform operations, the operations comprising:

receiving an opt-in from a customer mobile endpoint device to have the plurality of coordinate data transmitted from the customer mobile endpoint device to the application server in the network;

receiving the plurality of coordinate data transmitted from the customer mobile endpoint device as the customer mobile endpoint device traverses a route to a location that is not documented on an existing map, wherein the plurality of coordinate data is received with a street name;

processing the plurality of coordinate data, wherein the processing comprises comparing the plurality of coordinate data against the existing map;

identifying the route associated with the plurality of coordinate data as a candidate new route to add to the existing map when the route is not previously known on the existing map;

verifying the candidate new route as a new route when a number of customers reporting the plurality of coordinate data for the candidate new route is above a predefined threshold, wherein the verifying the candidate new route comprises verifying the candidate new route against postal addresses; and updating a route database with the candidate new route and the street name when the candidate new route is verified as the new route, wherein the route database is stored in the network.

* * * * *